s011318970B2

(12) United States Patent
Angel et al.

(10) Patent No.: US 11,318,970 B2
(45) Date of Patent: May 3, 2022

(54) VEHICLE CONTROL SYSTEM

(71) Applicant: Westinghouse Air Brake Technologies Corporation, Wilmerding, PA (US)

(72) Inventors: Kevin J. Angel, Marion, IA (US); Ann K. Grimm, Cedar Rapids, IA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 232 days.

(21) Appl. No.: 16/601,132

(22) Filed: Oct. 14, 2019

(65) Prior Publication Data

US 2020/0039546 A1 Feb. 6, 2020

Related U.S. Application Data

(63) Continuation-in-part of application No. 15/439,119, filed on Feb. 22, 2017, now Pat. No. 10,457,299.

(51) Int. Cl.
*B61L 25/02* (2006.01)
*B60W 40/10* (2012.01)
*B60W 50/16* (2020.01)
*B60W 50/00* (2006.01)

(52) U.S. Cl.
CPC .......... *B61L 25/023* (2013.01); *B60W 40/10* (2013.01); *B60W 50/16* (2013.01); *B60W 2050/0075* (2013.01); *B60W 2300/44* (2013.01); *B60W 2520/04* (2013.01); *B60W 2556/10* (2020.02); *B61L 2205/04* (2013.01)

(58) Field of Classification Search
CPC ... B61K 9/00; B61K 9/02; B61K 9/08; B61K 9/12; B61L 25/00; B61L 25/02; B61L 25/021; B61L 25/023; B61L 25/025; B60W 40/10; B60W 50/16; B60W 2050/0089; B60W 2300/44; B60W 2520/04; B60W 2205/04
See application file for complete search history.

(56) References Cited

U.S. PATENT DOCUMENTS 6,873,888 B2 * 3/2005 Kumar ................... B60L 15/20
701/19

* cited by examiner

*Primary Examiner* — Robert J McCarry, Jr.
(74) *Attorney, Agent, or Firm* — The Small Patent Law Group LLC; Philip S. Hof

(57) ABSTRACT

A vehicle control system includes a movement sensor configured to output information indicative of movement of a vehicle system and a controller configured to determine whether the vehicle system has stopped moving based on the information that is output from the movement sensor. The controller is configured to increment a counter based on a length of time that the vehicle system has remained stopped. The controller is configured to control operation of the vehicle system based on the counter that is incremented.

20 Claims, 5 Drawing Sheets

VEHICLE CONTROL SYSTEM

CROSS-REFERENCE TO RELATED APPLICATIONS

This application is a continuation-in-part of U.S. patent application Ser. No. 15/439,119, filed 22 Feb. 2017, the entire disclosure of which is incorporated herein by reference.

BACKGROUND

Technical Field

The subject matter described herein relates to vehicle systems and vehicle control systems.

Discussion Of Art

Vehicle systems and networks exist throughout the world, and, at any point in time, a multitude of vehicles, such as cars, trucks, buses, trains, and the like, are travelling throughout the system and network. With specific reference to trains travelling in a track network, the locomotives of such trains may be equipped with or operated using train control, communication, and management systems (e.g., positive train control (PTC) systems), such as the I-ETMS® of Wabtec Corp. In order to effectively manage all of the trains, navigation and enforcement systems and processes are implemented, both at the train level and the central dispatch level.

Existing sources of time on-board a locomotive or control car of a train do not take advantage of interfaces to a locomotive wheel tachometer or a track database to put time into context in a useful manner for an operator or crew of the train. For example, the I-ETMS® of Wabtec Corp. includes a current local time displayed in the upper left-hand corner of the on-board segment display. This clock is displayed when the on-board segment has a known track location so that the on-board segment can look up a local time zone from track data and display the current local time for the time zone in which the train is located. For the operator of the train to use the clock to determine how long the train has been stopped, however, the operator must remember to make note of the time when the train first comes to a stop, make note of the time when the train starts to move again, and mentally perform a calculation of the difference therebetween to determine how long the train is stopped. This introduces the possibility for operator error and requires additional effort on the part of the operator or crew.

Furthermore, there are other scenarios where it is useful to the operator or crew of the train to know how long the train has been stopped. For example, the General Code of Operating Rules (GCOR) Rule 6.32.6 Blocking Public Crossings states that crews should avoid blocking a public crossing for longer than ten minutes. Accordingly, it is useful to the operator or crew of the train to know how long the train has been stopped with respect to a particular location or track feature, such as a crossing. Moreover, it is useful to the operator or crew of the train to know how long the train has been stopped for reporting delays back to a dispatcher, e.g., with respect to freight trains.

BRIEF DESCRIPTION

In one embodiment, a vehicle control system is provided that includes a movement sensor configured to output information indicative of movement of a vehicle system and a controller configured to determine whether the vehicle system has stopped moving based on the information that is output from the movement sensor. The controller is configured to increment a counter based on a length of time that the vehicle system has remained stopped. The controller is configured to control operation of the vehicle system based on the counter that is incremented.

A method for controlling a vehicle system is provided that includes monitoring movement of a vehicle system, determining whether the movement of the vehicle system has stopped, incrementing a counter based on a length of time that the vehicle system has remained stopped, and controlling operation of the vehicle system using a controller of the vehicle system based on the counter that is incremented.

A vehicle control system is provided that includes a movement sensor configured to output information indicative of movement of a vehicle system and a controller configured to determine whether the vehicle system has stopped moving based on the information that is output from the movement sensor. The controller is configured to increment a counter based on a length of time that the vehicle system has remained stopped. The controller is configured to determine whether the counter exceeds a threshold count and to control operation of the vehicle system responsive to the counter exceeding the threshold count.

BRIEF DESCRIPTION OF THE DRAWINGS

The subject matter described herein includes descriptions of non-limiting embodiments, with reference to the attached drawings, wherein below.

DETAILED DESCRIPTION

Figure 1:
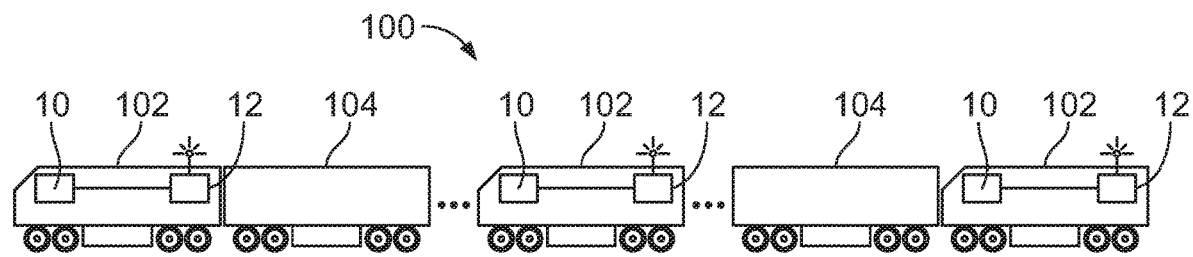
FIG. 1 illustrates one example of a vehicle system.

The inventive subject matter described herein relates to vehicle control systems and methods for determining and/or providing a vehicle system with an amount of time that the vehicle system is stopped. This information can be used in connection with rail vehicles (e.g., trains) located in a route network, but alternatively may be used with other types of vehicles. For example, the subject matter described herein can be used in connection with automobiles, trucks, buses, agricultural vehicles, mining vehicles, other off-highway vehicles, or the like. The vehicle systems described herein can be formed from multiple vehicles or a single vehicle. The multiple vehicles can be mechanically coupled or logically coupled (e.g., with the vehicles communicating with each other to coordinate movements so that the vehicles travel together as a convoy without the vehicles being mechanically coupled with each other).

In one embodiment, a system and computer-implemented method are provided that can be used to enhance existing vehicle control systems. The system and computer-implemented method can take advantage of an interface to a wheel tachometer and/or a route database to put time into context in a useful manner for an operator or crew of a vehicle system. In one embodiment, a system and computer-implemented method provide railroad operators or crews information indicating how long a train has been stopped, for example, for passenger and commuter trains to time station stops and for freight customers to accurately track and report train delays. The system and computer-implemented method can use an accurate source of vehicle speed, such as an output from an active wheel tachometer, to determine and/or provide an amount of time that a vehicle system is stopped.

The control system can include an operator interface on-board at least one vehicle of the vehicle system that provides information to an operator of the vehicle system. The control system also can include at least one computer programmed or configured to receive or determine an indication that the vehicle system is stopped, repeatedly or continuously increment a counter in response to the indication that the vehicle system is stopped, and control the operator interface to output a current count of the counter to the operator of the vehicle system. The control system receive or determine an indication that the vehicle system is moving and stop incrementing the counter in response to the indication that the vehicle system is moving.

The control system can include a movement sensor such as an active wheel tachometer configured to provide the indication that the vehicle system is stopped to the at least one computer. Alternatively, the control system can use another type of sensor, such as a global positioning system (GPS) receiver, an antenna (e.g., for triangulating positions based on communication of wireless signals), a dead reckoning system, an accelerometer, an inertial sensor, or the like. The operator interface can include a visual display device configured to display the current count of the counter to the operator of the vehicle system. Optionally, the operator interface includes an audio output device configured to output an audible signal based at least partly on the current count of the counter. The control system can compare the current count of the counter to a threshold count and control the operator interface to output an alert if the current count of the counter violates the threshold count (e.g., is greater than the threshold count).

The control system can receive or determine at least one location associated with the vehicle system (e.g., the location of a vehicle in the vehicle system or another location associated with the vehicle system). The control system can compare the current count of the counter to a threshold count associated with the at least one location. The control system can direct the operator interface to output an alert responsive to the current count of the counter violating (e.g., exceeding) the threshold count associated with the at least one location. The control system may determine that the location corresponds to a location of a route data feature associated with the threshold count.

The control system may include at least one of a GPS and an inertial sensor system, wherein the at least one computer is programmed or configured to: determine the at least one location associated with the train, the at least one locomotive or control car of the train, the at least one railroad car, or any combination thereof based on data received from at least one of the GPS receiver, the inertial sensor system, or any combination thereof.

The control system may direct the operator interface to continuously or otherwise repeatedly (in a non-continuous manner) output a count at which the counter is stopped incrementing when or while the vehicle system is moving. The control system may reset the current count of the counter in response to the indication that the vehicle system is stopped before continuously or otherwise repeatedly incrementing the counter.

The control system can include one or more of the following as a movement sensor: a wheel tachometer, a GPS receiver, an inertial sensor system, a GLONASS system receiver, a Wi-Fi positioning system, or any combination thereof. The control system can determine the indication that the vehicle system is stopped based on output data from at least one of these sensors.

Methods for controlling a vehicle system also are provided. One or more of the methods can include receiving or determining an indication that the vehicle system is stopped, continuously or otherwise repeatedly (in a non-continuous manner) incrementing a counter in response to the indication that the vehicle system is stopped, and controlling the operator interface to output a current count of the counter to the operator of the vehicle system.

The method also can include receiving or determining an indication that the vehicle system is moving and stopping the incrementing of the counter in response to the indication that the vehicle system is moving. An output of an active wheel tachometer can be received or determined as the indication that the vehicle system is stopped.

The method can include controlling the visual display device to display the current count of the counter to the operator of the vehicle system and/or controlling an audio output device of the operator interface to output an audible signal based at least partly on the current count of the counter.

The method may include comparing the current count of the counter to a threshold count and controlling the operator interface to output an alert if the current count of the counter violates the threshold count. The method can include receiving or determining at least one location associated with the vehicle system, comparing the current count of the counter to a threshold count associated with the at least one location, and controlling the operator interface to output an alert if the current count of the counter violates the threshold count associated with the at least one location. The method can include determining that the at least one location corresponds to a location of a route data feature. The location of the route data feature can be associated with the threshold count. The method may include determining the at least one location associated with the vehicle system based on output data received from one or more sensors described herein.

The method can include controlling the operator interface to continuously or otherwise repeatedly output a count at which the counter is stopped incrementing when the vehicle system is moving. The method may include resetting the current count of the counter in response to the indication that the vehicle system is stopped before continuously or otherwise repeatedly incrementing the counter.

With respect to use of the control systems and methods in connection with rail vehicles, the control systems and methods can be implemented in various train control and management systems, e.g., the I-ETMS® of Wabtec Corp. The control systems and methods described herein are useful in connection with and/or at least partially implemented on one or more locomotives or control cars that make up a train. It should be noted that multiple locomotives or control cars may be included in the train to facilitate the reduction of the train to match with passenger (or some other) demand or requirement. Further, the method and systems described herein can be used in connection with commuter trains, freight train, and/or other train arrangements and systems. Still further, the train may be separated into different configurations (e.g., other trains) and moved in either a first direction and/or a second direction. Any configuration or arrangement of locomotives, control cars, and/or railroad cars may be designated as a train and/or a consist. The methods and systems described herein are used in connection with the locomotives or controls cars that are positioned on each end of the train, while in other preferred and non-limiting embodiments or aspects, the methods and systems described herein are used in connection with locomotives or control cars that are positioned intermediately in the train (since these intermediate locomotives or control cars may eventually become a controlling locomotive or control car when the train is reconfigured). It is also noted that the methods and systems described herein may be used in connection with "electrical multiple unit" (EMU) or "diesel multiple unit" (DMU) configurations, where a locomotive does not technically exist, but multiple control cars would still be present. Still further, the train may include only one locomotive or control car and/or some or no railroad cars. It should be noted that multiple locomotives or control cars may be included in the train to facilitate the reduction of the train to match with passenger (or some other) demand or requirement. Further, the method and systems described herein can be used in connection with commuter trains, freight trains, push-pull train configurations, and/or other train arrangements and systems. Still further, the train may be separated into different configurations (e.g., other trains) and moved in either a first direction and/or a second direction. Any configuration or arrangement of locomotives, control cars, and/or railroad cars may be designated as a train and/or a consist. Still further, it is to be expressly understood that the presently-invented methods and systems described herein may be implemented on and/or used in connection with an auxiliary vehicle, such as an auxiliary railroad vehicle, a maintenance vehicle or machine, a road vehicle (e.g., truck, pick-up truck, car, or other machine), a vehicle equipped to ride on the rails of the track, and/or the like.

FIG. 1 illustrates one example of a vehicle system 100 on which a vehicle control system may be disposed. The control system can determine and/or provide, onboard the vehicle system, an amount of time that the vehicle system is stopped. The vehicle system includes at least one propulsion-generating vehicle 102 and optionally one or more non-propulsion-generating vehicles 104. The propulsion-generating vehicles can represent vehicles capable of generating propulsion for moving, such as automobiles, locomotives, mining vehicles, agricultural vehicles, off-highway vehicles, marine vessels, aircraft (manned or unmanned), or the like. The non-propulsion-generating vehicles can represent vehicles incapable of generating propulsion, such as rail cars, trailers, barges, or the like.

One or more of the vehicles in the vehicle system is equipped with a controller 10 (e.g., an on-board controller, a management computer, one or more processors, and/or the like) programmed or configured to implement or facilitate at least one vehicle system control action and a communication device 12 in communication with the controller and programmed or configured to communicate and/or process data signals. While the communication device may be in the form of a wireless communication device, this communication device may also be programmed or configured to transmit, process, and/or receive signals over conductive pathways, such as wires, cables, trainlines, over rails, via power lines, or the like.

Figure 2:
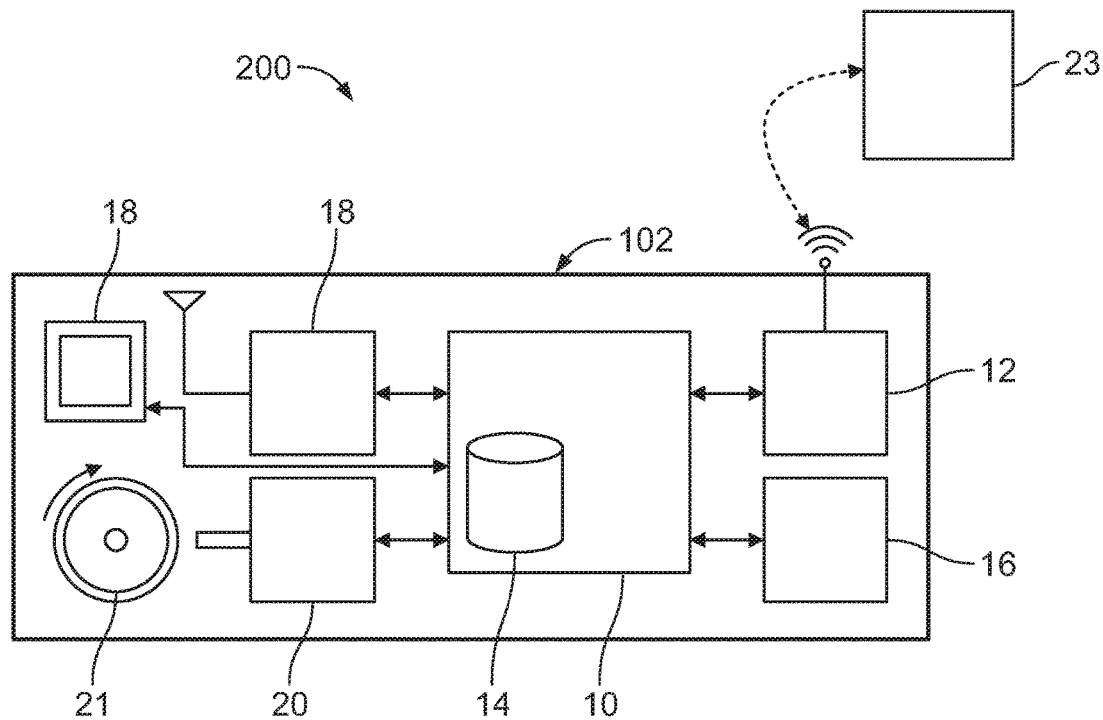
FIG. 2 illustrates one example of a vehicle control system.

FIG. 2 illustrates one example of a vehicle control system 200. The vehicle control system may be disposed on a single vehicle of the vehicle system shown in FIG. 1 or may be distributed among several vehicles in the vehicle system. While the control system is shown as being disposed onboard a propulsion-generating vehicle 102, alternatively, the control system may be disposed onboard a non-propulsion-generating vehicle 104.

The control system includes the controller 10 that operates to control movement of the vehicle, navigation of the vehicle, and/or enforcement of movement authorities for the vehicle. In one embodiment, the controller can be a train management computer or on-board computer that performs calculations for or within the Positive Train Control (PTC) system, including navigation and enforcement calculations. The communication device 12 can be a data radio or the like that may be used to facilitate the communications between the controller and other onboard devices, communications with a wayside device (e.g., signals, switch monitors, wayside devices, and the like), and/or communications with a remote server (e.g., a back office server 23, a central controller, central dispatch, or the like).

The control system includes a route database 14 and/or other database configured to store vehicle system-related information, such as information about route positions or locations, switch or intersection locations, crossing locations, route heading changes (e.g., curves, distance measurements, etc.), vehicle system information (e.g., the number of vehicles 102, the number of vehicles 104, the total length of the vehicle system, the identification numbers of each vehicle, etc. The vehicle includes a braking system 16 that represents air brakes, friction brakes, and/or dynamic or regenerative brakes that operate to slow or stop movement of the vehicle.

The control system can include a positioning system 18 (e.g., a Global Positioning System (GPS) receiver, dead reckoning system, wireless triangulation system, etc.) and a movement sensor 20 that detects or measures movement of the vehicle. The movement sensor can be a wheel tachometer that measures speeds at which a vehicle wheel 21 rotates, an accelerometer, or the like. Optionally, the positioning system can operate as the movement sensor to detect movement of the vehicle system. The control system includes an operator interface 24, such as a visual display device, touchscreen, speaker, microphone, or the like.

Figure 4:
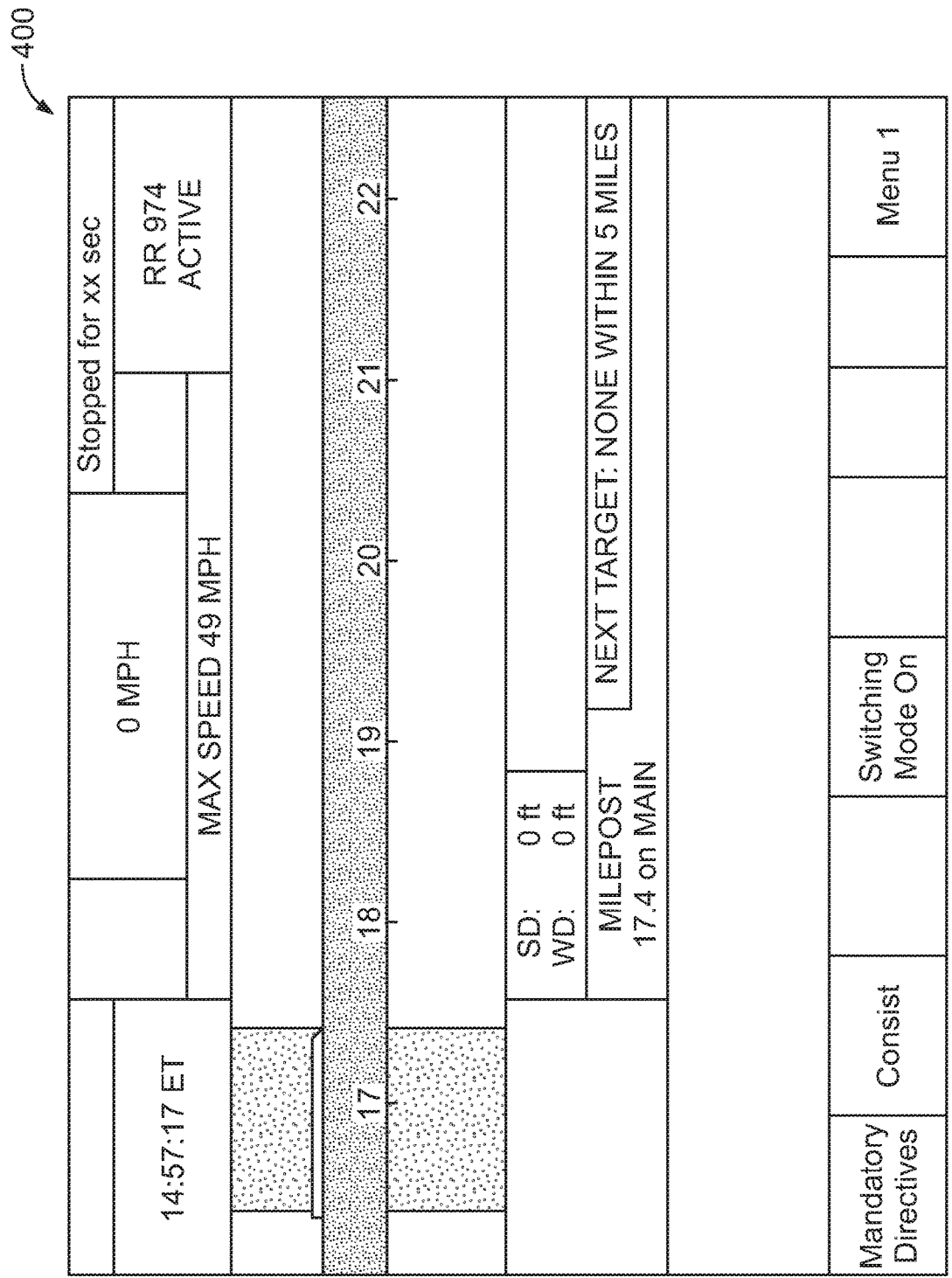
FIG. 4 illustrates one example of a counter on an operator interface.

Some or all of the operations described herein may be performed locally by the on-board controller and/or another computer (e.g., a computer associated with an end-of-train unit, a computer associated with a wayside device, the back office server, a remote computer or server associated with central dispatch, a central controller, a computer-aided dispatch system, and intermediate control computer, or the like). The vehicle control system can determine and provide notifications of an amount of time that the vehicle system is stopped. The operator interface may include an electronic display device that provides information and data to the operator of the vehicle system, such as the information, data, audio, and/or screens as discussed hereinafter. Optionally, the controller of the vehicle control system may communicate a notification that the vehicle system is stopped and/or an indication of how long the vehicle system has been stopped to an off-board location, such as the back-end server, the vehicle control system of another vehicle system, or the like. In one example, the controller can direct the operator interface to display a current count or time of a counter or timer to an operator or crew of the vehicle system. For example, the operator interface can provide the operator interface of a vehicle control system as shown in FIG. 4 with the current count or time of the counter or timer 400 displayed in the visual display device 24.

The counter or timer may be implemented in software and/or hardware by the controller. For example, the counter or timer may be implemented as a local counter or timer on-board the vehicle system and, in some implementations, the controller can implement the counter or timer based on an internal clock of the controller. In other implementations, the counter or timer may be implemented external to the vehicle system, for example, as part of the back office server 23. The controller can receive the current count or time of the counter or timer from the back office server 23 in a continuous, periodic, or other repeated manner, or in response to a request for the current count or time sent from the controller to the back office server 23 by communications device 12.

Figure 3:
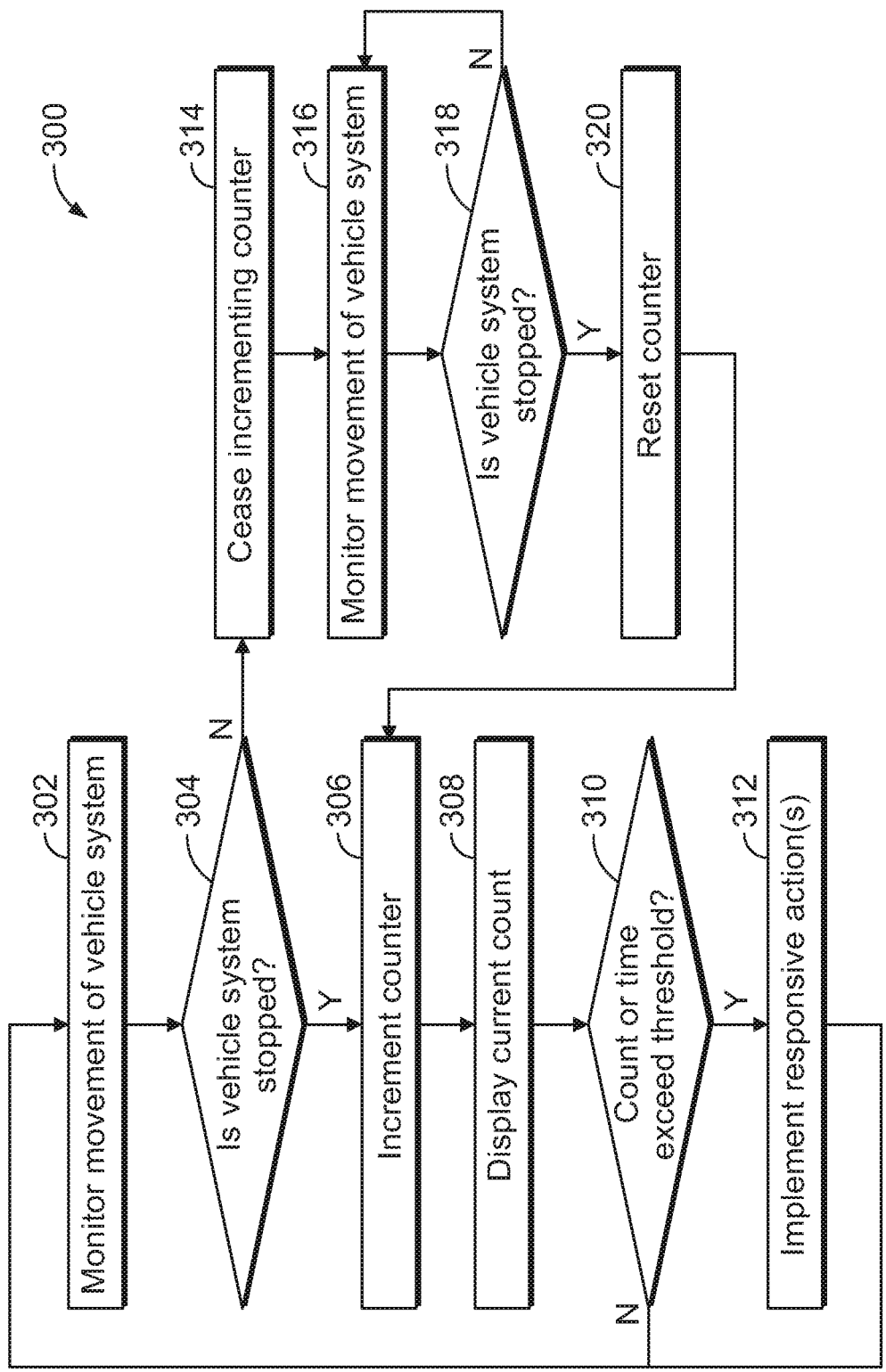
FIG. 3 illustrates a flowchart of one example method for controlling a vehicle system.

With continued reference to the vehicle control system shown in FIG. 2, FIG. 3 illustrates a flowchart of one embodiment of a method 300 for controlling a vehicle system. The method 300 can represent operations performed by the vehicle control system in one embodiment. At 302, movement of the vehicle system is monitored. For example, the controller can receive output from the movement sensor (s). At 304, a determination is made as to whether the vehicle system is stopped. The controller can determine whether the vehicle system is stopped based on output from the movement sensor. In an example, the controller can receive an output from a wheel tachometer that indicates a current speed of the vehicle system and/or the rotation speed of a wheel 21 of the vehicle system. The controller can determine whether the vehicle system is currently stopped or currently moving based on the output.

Optionally, the controller can receive output of sensor data from one or more other movement sensors, such as inertial sensors of the vehicle system (e.g., motion sensors (accelerometers) and rotation sensors (gyroscopes)) to continuously or repeatedly determine the position, orientation, and/or velocity (e.g., direction and speed of movement) of the vehicle system. The controller can determine whether the vehicle system is currently stopped or currently moving based on the output from the inertial sensors.

In another example, the controller can receive output of GPS data from the GPS receiver that indicates a location and/or speed of the vehicle system and determine whether the vehicle system is currently stopped or currently moving based on the output from the GPS receiver.

The controller can determine at least one location of the vehicle system using the Russian global positioning system GLONASS. The controller can receive an output of GLONASS data from the GLONASS system that indicates a current speed of the vehicle system and determine whether the vehicle system is stopped or moving based on the output from the GLONASS system.

The controller can determine at least one location of the vehicle system using a Wi-Fi positioning system as the movement sensor. The controller can receive an output of Wi-Fi positioning data from the Wi-Fi positioning system that indicates a current speed of the vehicle system and determine whether the vehicle system is stopped or moving based on the output from the Wi-Fi positioning system.

The movement sensor can be an active sensor that continues to produce output regardless of the movement or speed of the vehicle system. For example, the movement sensor can continue providing output indicative of the location and/or speed of the vehicle system even while the vehicle system is not moving. An active movement sensor can reduce an ambiguity that may arise as to when the vehicle system is actually stopped as compared to a passive movement sensor that may not reliably report a speed or location of the vehicle system. For example, passive movement sensors may not provide an output indicating a location or speed of the sensors while changes in the location do not exceed some threshold and/or the measured speeds are slower than a threshold, such as slower than five miles per hour.

The controller may use output from one or more of the different movement sensors described herein (e.g., the wheel tachometer, inertial sensor, GPS receiver, GLONASS system, Wi-Fi positioning system, etc.) to determine whether the vehicle system is stopped or moving. Optionally, the controller may require that the output from multiple different types of movement sensors (e.g., each of two or more of the wheel tachometer, inertial sensor, GPS receiver, GLONASS system, and/or the Wi-Fi positioning system) indicate that the vehicle system is moving or stationary to determine whether the vehicle system is moving or stationary. Optionally, the controller may rank or otherwise prioritize the outputs from different movement sensors such that a higher ranked or prioritized output overrides an indication from a lower ranked output. For example, if the GPS data indicates that the vehicle system is currently moving, but the output from the wheel tachometer indicates that the vehicle system is currently stopped, the controller may rely on the indication from the wheel tachometer over that of the GPS data.

If the controller determines that the vehicle system is stopped, the controller can increment the counter or timer at 304 in the method 300. For example, the controller can begin to increment the counter or timer by counting upwards or downwards from zero or another predetermined amount, such as a threshold amount, in one second increments (or another unit or increment of time) in response to a determination that the vehicle system is not moving. The controller can continue to increment the counter or timer while the vehicle system remains stopped, e.g., until the controller determines that the vehicle system is moving again.

Figure 5:
FIG. 5 illustrates another example of a counter on an operator interface.

At 306, the operator interface is controlled to output the current count or time of the counter or timer to the operator of the vehicle system. For example, the controller can direct the operator interface to display the current count or time of the counter or timer 400 to the operator of the vehicle system. As shown in FIG. 4, the current count or time of the counter or the timer 400 may be displayed in the upper right hand corner of the visual display device (or in another location). The current count or time may be displayed in increments of seconds and, when the period the vehicle system has been stopped exceeds 59 seconds, the current count or time of the counter or the timer 400 may be updated to show the time in minutes and seconds as shown in FIG. 5. Optionally, the current count or time may be represented by an icon and/or color representing how long the vehicle system has been stopped and/or if the vehicle system has been stopped for a period of time that exceeds a threshold period as discussed further herein. For example, a green icon may represent that the vehicle system has been stopped at a station stop for an acceptable period of time, whereas a red icon may represent a vehicle system that has been stopped at the station stop for an unacceptable period of time, e.g., a period of time that exceeds a threshold period for stops at the station.

In another example, the operator interface may comprise an audio output device configured to output an audible signal based at least partly on the current count or time of the counter or timer. For example, an audio output indicating the current count or time of the count or timer may be played in a continuous or periodic manner, in response to the vehicle system being stopped for a period of time that exceeds a threshold period, and/or in response to a request for the current count or time from the operator or crew of the vehicle system. The audio output device can be implemented as part of the visual display device 24, such as speakers incorporated therein.

At 308 in the method 300, a determination is made as to whether the current count or time that the vehicle system is stopped exceeds a threshold count or time. For example, the controller can compare the current count or time of the counter or timer 400 to a threshold count or time period. The threshold count may be a user-configurable period of time that can be set by the operator or crew of the vehicle system or by dispatching authorities, for example, in a configuration file for the vehicle control system.

The threshold may be different for different locations of the vehicle system. For example, the controller can determine the location of the vehicle system and compare the location with route data in the route database 14 to determine the location of the vehicle system and the location of one or more route features. The controller can identify the route feature(s) that are within a threshold distance of the vehicle system. The route features can include route crossings or intersections, passenger stations, rail yards, parking lots, on-ramps and/or off-ramps to interstates, shipping locations or warehouses, or the like. The controller can determine which threshold is associated with the route feature that is near the vehicle system from the database.

A remote or off-board device (e.g., the back office server 23, a wayside device, a PTC component, a networked computer, or a combination thereof) can send a message with the threshold count(s) for a list of route features (for example, the station stop times for a given day for a given route) to the controller of the vehicle system. These threshold counts may override default threshold counts stored in the route data or in a configuration file in the database. The controller may replace a threshold count stored in the route data with the updated threshold count received from the remote or off-board device.

The threshold counts can be updated (e.g., automatically or manually) in the vehicle control system based on various factors such as a time of day, current vehicular traffic at or nearby a route feature (e.g., a busy or empty station stop), a current operator of the vehicle system, whether the vehicle system is running on schedule or behind schedule, a type of the vehicle system (e.g., commuter or freight), or other information determined and/or stored by the vehicle control system.

For example, a threshold count may be reduced during times of the day that are associated with increased traffic flow (such as rush hour) relative to other times associated with less traffic flow (such as night time). The threshold count may be reduced for locations associated with increased traffic flow relative to other locations, and increased for locations associated with reduced traffic flow relative to other locations. The threshold count may be increased for operators having less training or experience than other, more experienced or highly trained operators. The threshold count may be decreased for operators having more training or experience than other, less experienced operators or operators having less training. The threshold count may be different for different types of vehicle systems. For example, commuter vehicles carrying persons may have shorter threshold counts than freight vehicles carrying other types of cargo.

The threshold count may be different for different types of cargo. For example, vehicle systems transporting hazardous cargo (e.g., caustic, flammable, or radioactive cargo) may be associated with shorter threshold counts than vehicle systems transporting other, non-hazardous types of cargo (e.g., persons, cargo that is not caustic, cargo that is not flammable, or cargo that is not radioactive). The threshold count may dynamically change with respect to time for vehicle systems based on the type of cargo being carried. For example, the threshold count may be shortened for vehicle systems carrying cargo that will spoil (e.g., food, produce, livestock, certain chemicals, etc.) relative to vehicle systems carrying cargo that does not spoil or that may spoil after much longer time periods. The threshold count may change based on how many times a vehicle system has exceeded the threshold count during the same trip. For example, the threshold count can be shortened after each time that the threshold is exceeded or may be shortened after being exceeded at least a designated number of times (e.g., three times).

Figure 6:
FIG. 6 illustrates another example of a counter on an operator interface.

If the current count or time exceeds the threshold, then flow of the method 300 can proceed toward 310. At 310, one or more responsive actions are implemented. In one example, the controller can direct the operator interface to output an alert responsive to the current count or time of the counter or timer violating the threshold count or time period. The counter or timer may be stopped or continue to increment after the threshold is violated. As shown in the example operator interface in FIG. 6, when the threshold period is set to thirty minutes and the current count or time exceeds the thirty minute threshold period, the controller controls the display device to display an indication that the amount of time that the vehicle system has been stopped exceeds the threshold period.

As another example of a responsive action that the controller may implement includes changing a schedule of the vehicle system and/or one or more other vehicle systems. The schedule of a vehicle system can dictate times at which the vehicle system is to be at or past one or more designated locations. The schedule may be impacted by other vehicle systems being ahead or behind schedule, such as when one vehicle system cannot cross another route, occupy a route segment, or the like, because another vehicle system is not traveling according to a designated schedule. The controller can modify the schedule of the vehicle system responsive to determining that the vehicle system or another vehicle system has been stopped for longer than a designated threshold. This can prevent the stoppage from interfering with or preventing the vehicle system or another vehicle system from safely and/or timely traveling along the routes. The change in the schedule can occur by the controller sending a signal to the back-office server, which changes the schedule and communicates the changed schedule to the vehicle system(s) affected by the changed schedule. The schedule that is changed can be the schedule of the vehicle system that has been stopped for longer than the threshold count. Optionally, the schedule that is changed can be the schedule of another vehicle system (e.g., that has not been stopped for longer than the threshold count). This can allow for the stoppage of one vehicle system to not interfere with another vehicle system completing scheduled travel according to the modified schedule.

Another example of a responsive action that may be implemented is the order or request for maintenance, repair, and/or inspection of the vehicle system. For example, the controller can automatically run one or more tests or other diagnostic examinations of components of the vehicle system responsive to the count exceeding the designated threshold. Optionally, the controller can automatically order replacement parts for one or more components of the vehicle system. The controller can order these parts to be delivered to an upcoming location that the vehicle system is headed toward, such as a repair facility (so that the parts are at the location before or when the vehicle system arrives at the location). As another example, the controller can automatically order or request repair or maintenance personnel be dispatched to the location where the vehicle system is stopped responsive to the count exceeding the threshold. The controller can order the personnel to travel to the vehicle system to repair, inspect, or maintain the vehicle system.

Optionally, the controller can direct an operator of the vehicle system to control the vehicle system to begin moving again or can automatically control the vehicle system to begin moving again responsive to the count exceeding the threshold. The controller may change which route that the vehicle system is traveling on or heading toward responsive to the count exceeding the threshold. For example, the controller may change a planned trip of the vehicle system, can communicate a change in travel plans to the back-office server, can communicate a signal to a switch to change a state or position of the switch to change which route the vehicle system is traveling or planning to travel on.

Flow of the method 300 can return toward 302 or terminate following implementation of the responsive action(s) at 310. Returning to the description of 304, if the vehicle system is not determined to be stopped based on sensor output, then the counter is not incremented by the controller and/or increases in the counter are stopped by the controller at 314. At 316, the operator interface can output or continue to output the current count or time of the counter or timer. For example, the display of the duration that the vehicle system was previously stopped (e.g., at 308) can remain on the operator interface so the operator or crew can record the period for which the vehicle system was stopped at a later time (e.g., after the vehicle system has resumed movement. The controller can store the count or time at which the counter or timer stopped incrementing in the database 14 or another location, and/or may communicate the count or time to an off-board location (e.g., the back office server). The count at which the counter or timer stopped incrementing can be stored in association with a timestamp of the stop (e.g., a local time of the stop), an identifier of the vehicle system and/or vehicles in the vehicle system, a location of the vehicle system during the stop, and/or a route feature associated with the location of the vehicle system during the stop. The controller can communicate the count or time at which the counter or timer stopped incrementing via the communications device 12 to an external location, such as the back office server 23, responsive to the incrementing of the counter or timer ceasing, responsive to the count violating a threshold count, periodically, and/or each time the count is incremented.

At 316, movement of the vehicle system is monitored. For example, the controller can continue receiving output from the movement sensor(s) to track movement of the vehicle system, as described above. At 318, a determination is made as to whether the vehicle is stopped. For example, the controller can determine whether the output(s) from the movement sensor(s) indicate that the vehicle system has stopped moving. If the vehicle system has stopped, then flow of the method 300 can proceed toward 320. Otherwise, flow of the method 300 can return toward 316 so that movement of the vehicle system can continue to be monitored.

At 320, the count or time of the counter or timer is reset. For example, the controller can reset the counter or timer in response to determining that the vehicle system is stopped at 318. Flow of the method 300 can proceed toward 306 where the counter is incremented, as described above.

In one embodiment, a vehicle control system is provided that includes a movement sensor configured to output information indicative of movement of a vehicle system and a controller configured to determine whether the vehicle system has stopped moving based on the information that is output from the movement sensor. The controller is configured to increment a counter based on a length of time that the vehicle system has remained stopped. The controller is configured to control operation of the vehicle system based on the counter that is incremented. In one example, the controller can automatically control operation of the vehicle system (e.g., without operator intervention).

For example, the controller can direct an operator interface of the vehicle system to generate an alert to an operator of the vehicle system based on the counter exceeding a threshold count. Optionally, the controller can change a travel schedule of the vehicle system based on the counter. Additionally or alternatively, the controller can change a travel schedule of another vehicle system based on the counter. The controller can order one or more of a repair, inspection, or maintenance of the vehicle system responsive to the counter exceeding a threshold count. The controller can resume movement of the vehicle system responsive to the counter exceeding a threshold count. The controller may change which route the vehicle system resumes movement along based on the counter.

The movement sensor may include one or more of a tachometer, a global positioning system receiver, an antenna, an accelerometer, or an inertial sensor. The movement sensor can be a first movement sensor, and the controller can determine whether the vehicle system has stopped moving based on the information that is output from the first movement sensor and from at least a different, second movement sensor.

The controller can determine whether the vehicle system has stopped moving based on the information that is output from the first movement sensor and the second movement sensor and based on a ranking of the first movement sensor and the second movement sensor.

A method for controlling a vehicle system is provided that includes monitoring movement of a vehicle system, determining whether the movement of the vehicle system has stopped, incrementing a counter based on a length of time that the vehicle system has remained stopped, and controlling operation of the vehicle system using a controller of the vehicle system based on the counter that is incremented. In one example, the operation of the vehicle system is automatically controlled (e.g., without operator intervention).

Controlling operation of the vehicle system can include generating an alert on an operator interface onboard the vehicle system. Optionally, controlling operation of the vehicle system can include changing a travel schedule of the vehicle system based on the counter. Additionally or alternatively, controlling operation of the vehicle system includes changing a travel schedule of another vehicle system based on the counter. Controlling operation of the vehicle system may include ordering one or more of a repair, inspection, or maintenance of the vehicle system responsive to the counter exceeding a threshold count. Controlling operation of the vehicle system can include resuming movement of the vehicle system responsive to the counter exceeding a threshold count. Controlling operation of the vehicle system may include changing which route the vehicle system resumes movement along based on the counter.

Monitoring the movement of the vehicle system can include receiving information output by plural different movement sensors that is indicative of the movement of the vehicle system, and determining whether the movement of the vehicle system has stopped is based on the information output by each of the different movement sensors.

A vehicle control system is provided that includes a movement sensor configured to output information indicative of movement of a vehicle system and a controller configured to determine whether the vehicle system has stopped moving based on the information that is output from the movement sensor. The controller is configured to increment a counter based on a length of time that the vehicle system has remained stopped. The controller is configured to determine whether the counter exceeds a threshold count and to control operation of the vehicle system responsive to the counter exceeding the threshold count. In one example, the controller can automatically control operation of the vehicle system (e.g., without operator intervention).

Optionally, the controller is configured to determine a location of the vehicle system based on the information output by the movement sensor. The controller can be configured to select the threshold count from among several different threshold counts associated with different route locations based on the location of the vehicle system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle control system comprising:
   a movement sensor configured to output information indicative of movement of a vehicle system; and
   a controller configured to determine whether the vehicle system has stopped moving based on the information that is output from the movement sensor, the controller configured to increment a timer based on a length of time that the vehicle system has remained stopped,
   wherein, responsive to the timer exceeding a threshold time, the controller is configured to control operation of the vehicle system based on the timer that is incremented by one or more of changing a travel schedule of the vehicle system, changing a travel schedule of another vehicle system, resuming movement of the vehicle system, or changing which route the vehicle system resumes movement along.

2. The vehicle control system of claim 1, wherein the controller is configured to direct an operator interface of the vehicle system to generate an alert to an operator of the vehicle system based on the timer exceeding the threshold time.

3. The vehicle control system of claim 1, wherein the controller is configured to order one or more of a repair, inspection, or maintenance of the vehicle system responsive to the timer exceeding the threshold time.

4. The vehicle control system of claim 1, wherein the movement sensor includes one or more of a tachometer, a global positioning system receiver, an antenna, an accelerometer, or an inertial sensor.

5. The vehicle control system of claim 1, wherein the movement sensor is a first movement sensor, and the controller is configured to determine whether the vehicle system has stopped moving based on the information that is output from the first movement sensor and from at least a different, second movement sensor.

6. The vehicle control system of claim 5, wherein the controller is configured to determine whether the vehicle system has stopped moving based on the information that is output from the first movement sensor and the second movement sensor and based on a ranking of the first movement sensor and the second movement sensor.

7. The vehicle control system of claim 1, wherein the controller is configured to determine the threshold time based on one or more of a location of the vehicle system, a time of day, vehicular traffic near the vehicle system, an operator of the vehicle system, a type of the vehicle system, or a type of cargo carried by the vehicle system.

8. The vehicle control system of claim 1, wherein the controller is configured to determine a location of the vehicle system based on the information output by the movement sensor, and to select the threshold time from among several different threshold times associated with different route locations based on the location of the vehicle system.

9. The vehicle control system of claim 1, wherein the controller is configured to shorten the threshold time based on the timer exceeding the threshold time during a previous event in which the vehicle system remained stopped for a length of time within a same trip as a current stoppage of the vehicle system.

10. A method comprising:
monitoring movement of a vehicle system;
determining whether the movement of the vehicle system has stopped;
incrementing a timer based on a length of time that the vehicle system has remained stopped; and
responsive to the timer exceeding a threshold time, controlling operation of the vehicle system using a controller of the vehicle system based on the timer that is incremented, wherein controlling the operation of the vehicle system comprises one or more of changing a travel schedule of the vehicle system, changing a travel schedule of another vehicle system, resuming movement of the vehicle system, or changing which route the vehicle system resumes movement along.

11. The method of claim 10, wherein controlling the operation of the vehicle system includes generating an alert on an operator interface onboard the vehicle system.

12. The method of claim 10, wherein controlling the operation of the vehicle system includes ordering one or more of a repair, inspection, or maintenance of the vehicle system responsive to the timer exceeding the threshold time.

13. The method of claim 10, wherein monitoring the movement of the vehicle system includes receiving information output by plural different movement sensors that is indicative of the movement of the vehicle system, and determining whether the movement of the vehicle system has stopped is based on the information output by each of the different movement sensors.

14. The method of claim 10, further comprising determining the threshold time based on one or more of a location of the vehicle system, a time of day, vehicular traffic near the vehicle system, an operator of the vehicle system, a type of the vehicle system, or a type of cargo carried by the vehicle system.

15. The method of claim 10, further comprising:
determining a location of the vehicle system based on the information output by the movement sensor; and
selecting the threshold time from among several different threshold times associated with different route locations based on the location of the vehicle system.

16. The method of claim 10, further comprising shortening the threshold time based on the timer exceeding the threshold time during at least one previous event in which the vehicle system remained stopped for a length of time within a same trip as a current stoppage of the vehicle system.

17. A vehicle control system comprising:
a movement sensor configured to output information indicative of movement of a vehicle system; and
a controller configured to determine whether the vehicle system has stopped moving based on the information that is output from the movement sensor, the controller configured to increment a timer based on a length of time that the vehicle system has remained stopped, the controller configured to determine whether the timer exceeds a threshold time and to control operation of the vehicle system responsive to the timer exceeding the threshold time,
wherein the controller is configured to determine the threshold time based on one or more of a location of the vehicle system, a time of day, vehicular traffic near the vehicle system, an operator of the vehicle system, a type of the vehicle system, or a type of cargo carried by the vehicle system.

18. The vehicle control system of claim 17, wherein the controller is configured to determine the location of the vehicle system based on the information output by the movement sensor, the controller configured to select the threshold time from among several different threshold times associated with different route locations based on the location of the vehicle system.

19. The vehicle control system of claim 17, wherein the controller is configured to control operation of the vehicle system by one or more of changing a travel schedule of the vehicle system, changing a travel schedule of another vehicle system, resuming movement of the vehicle system, or changing which route the vehicle system resumes movement along.

20. The vehicle control system of claim 17, wherein the movement sensor is a tachometer that monitors rotation of a wheel of the vehicle system.

* * * * *